United States Patent Office 3,641,167
Patented Feb. 8, 1972

3,641,167
HIGHLY FLUORINATED ALKYLADAMANTANES
Robert E. Moore, Wilmington, Del., and Edward J. Janoski, Havertown, Pa., assignors to Sun Oil Company, Philadelphia, Pa.
No Drawing. Continuation-in-part of abandoned application Ser. No. 314,529, Oct. 7, 1963. This application Mar. 17, 1965, Ser. No. 440,614
Int. Cl. C07c 23/38
U.S. Cl. 260—648 F                12 Claims

ABSTRACT OF THE DISCLOSURE

This invention relates to highly fluorinated alkyladamantanes having 12–14 carbon atoms per molecule. More specifically the alkyladamantanes from which the fluorinated products are derived are 1,3-dimethyladamantane, 1,3,5-trimethyladamantane, 1-ethyladamantane, 1-ethyl-3-methyladamantane and 1-ethyl-3,5-dimethyladamantane. The fluorinated products of the invention are liquids at room temperature and are characterized by a high degree of stability and an unusually wide temperature range in which they remain in liquid state.

---

This application is a continuation-in-part of our co-pending application Ser. No. 314,529, filed Oct. 7, 1963 and now abandoned.

This invention relates to highly fluorinated alkyladmantanes having 12–14 carbon atoms per molecule. More specifically the alkyladamantanes from which the fluorinated products are derived are 1,3-dimethyladamantane, 1,3,5-trimethyladamantane, 1-ethyladamantane, 1-ethyl-3-methyladamantane and 1-ethyl-3,5-dimethyladamantane. The fluorinated products of the invention are liquids at room temperature and are characterized by a high degree of stability and an unusually wide temperature range in which they remain in liquid state.

The carbon nucleus of adamantane (tricyclo[3.3.1$^{3,7}$] decane) contains ten carbon atoms arranged in a completely symmetrical, strainless manner such that four of the carbon atoms occupy bridgehead positions. The structure of adamantane ($C_{10}H_{16}$) is commonly depicted typographically as follows:

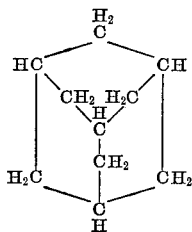

This hydrocarbon has a melting point of 268° C., sublimes beneath its melting point and hence does not occur in liquid form. Due to the symmetrical, strainless arrangement of the carbon atoms and the fact that dehydrogenation cannot occur because of the bridgehead carbon atoms, adamantane is a highly stable hydrocarbon.

The starting hydrocarbons for preparing the fluorinated products of the present invention are $C_{12}$–$C_{14}$ alkyl derivatives of adamantane having from one to three alkyl groups, which groups are methyl and/or ethyl and contain a total of from two to four alkyl carbon atoms. The alkyl substituents are positioned at bridgehead carbon atoms. Thus the starting hydrocarbon is 1,3-dimethyladmantane, 1,3,5-trimethyladamantane, 1-ethyladmantane, 1-ethyl-3-methyladamantane or 1-ethyl-3,5-dimethyladamantane. Unlike, adamantane itself, these alkyl derivatives are liquids even at temperatures considerably below 0° C.

According to the invention, these alkyladamantanes are subjected to fluorinating conditions effective to result in a degree of fluorination which is at least 75% of that corresponding to perfluorination. In other words at least 75% of the hydrogen atoms, more preferably at least 90% thereof, are replaced by fluorine atoms. Thus the products from dimethyladamantane and ethyladamantane ($C_{12}H_{20}$) contain an average of at lest 15 fluorine atoms, those from trimethyladamantane and ethylmethyladamantane ($C_{13}H_{22}$)

contain at least 17 fluorine atoms and that from ethyldimethyladamantane ($C_{14}H_{24}$) contain at least 18 fluorine atoms. In cases where the product is to be used as a dielectric medium, for example, as a dielectric coolant for transformers, fluorinating conditions are used such that all of the hydrogen atoms are replaced by fluorine atoms. This results in a product having a low dielectric constant and low power factor.

The highly fluorinated alkyladamantanes of the invention are liquids at temperatures even below −25° C. and they have boiling points above 170° C. Thus they remain in liquid state throughout an unusually wide temperature range. Due to the adamantane structure of the nucleus and the high degree of fluorination, these products are extremely stable compounds. They are resistant to strong acids and alkalis and also to oxidizing and reducing agents. They are further characterized by high density, immiscibility with hydrocarbons or with water, non-corrosiveness and non-flammability. These properties make the products especially suitable for use as hydraulic fluids and dielectric coolants. The following are some of the applications for which the fluorinated alkyladamantanes are particularly useful: gas turbine engine coolant, arc quenching fluid, instrument fluid and dielectric coolant for transformers, electronic assemblies, power tubes, generators, motors, and the like.

Fluorination of the alkyladamantanes can be carried out according to known methds for fluorinating hydrocarbons. One suitable method involves contacting the alkyladamantane in vapor form at a temperature in the range of 300–350° C. with a bed of powdered cobaltic fluoride ($CoF_3$). In this procedure the $CoF_3$ reacts with the hydrocarbon forming HF and substituting fluorine in place of the hydrogen on both the adamantane nucleus and the alkyl substituents. This fluorinating procedure has been described in "Advances in Flourine Chemistry," vol. I, (1961), pages 166 et sequa. Sufficient contacting of the hydrocarbon with $CoF_3$ is done to cause at least 75%, more preferably more than 90%, of the hydrogen atoms to be replaced by fluorine atoms. If necessary, partly fluorinated effluent from the reactor can be recycled for further fluorination. In cases where the product is to be used as a dielectric medium, contacting with the $CoF_3$ should be sufficiently prolonged to effect perfluorination, i.e., complete replacement of all hydrogen atoms by fluorine. When this is done, the products obtained are perfluoro-1,3-dimethyl-adamantane, perfluoro-1,3,5-trimethyladamantane, perfluoro-1-ethyladamantane, perfluoro-1-ethyl-3-methyladamantane or perfluoro-1-ethyl-3,5-dimethyladamantane depending upon which hydrocarbon is used as feed.

As a general rule, use of the $CoF_3$ procedure for fluorinating hydrocarbons causes substantial by-product formation resulting from scission of carbon-to-carbon bonds. In preparing the present products such degradation reaction fortuitously does not occur to any substantial extent due to the unusual stability of the adamantane nucleus.

Fluorination of the alkyladamantanes can also be effected by electrolysis of an emulsion of the hydrocarbon in anhydrous hydrogen fluoride containing alkali metal fluoride as electrolyte. This type of fluorination is also described in the above-mentioned text, vol. I, pages 129–138. The electrolysis can be carried out at a temperature of 0–10° C. using a potential of about 5 v. This procedure likewise does not cause substantial degradation resulting from scission of carbon-to-carbon bonds of the alkyladamantane hydrocarbons.

The $C_{12}$–$C_{14}$ alkyladamantanes to be fluorinated can be obtained by the isomerization of $C_{12}$–$C_{14}$ perhydroaromatic hydrocarbons containing three rings using HF-BF$_3$ or aluminum chloride or bromide as catalyst. Schneider U.S. Pat. No. 3,128,316 describes isomerizations of this type using aluminum halide catalysts. By way of example, perhydroacenaphthene which has 12 carbon atoms and 3 rings can be isomerized by means of HF-BF$_3$ or AlCl$_3$-HCl to 1-ethyladamantane. Actually this compound is an intermediate in the isomerization reaction, and if the reaction is allowed to proceed far enough the end product will be 1,3-dimethyladamantane. Hence, in cases where 1-ethyladamantane is the hydrocarbon for practicing the invention, it is important that the isomerization reaction be stopped at the proper point. When 1,3-dimethyladamantane is the desired hydrocarbon, the isomerization reaction should be allowed to proceed to substantial completion. The 1,3-dimethyladamantane or the 1-ethyladamantane can be produced in this manner from any tricyclic naphthene having 12 carbon atoms per molecule.

In preparing 1-ethyl-3-methyladamantane any tricyclic naphthene having 13 carbon atoms can be used. For example, perhydrofluorene can be isomerized by means of HF-BF$_3$ or AlCl$_3$-HCl to form 1-ethyl-3-methyladamantane. Again, this compound is an intermediate in the isomerization reaction, the ultimate isomerization product being 1,3,5-trimethyladamantane. Hence the latter can be obtained as the main product if the reaction is allowed to proceed beyond the intermediate stage.

Any completely hydrogenated $C_{14}$ tricyclic aromatic, for example perhydroanthracene, when isomerized with HF-BF$_3$ or AlCl$_3$-HCl will convert to 1-ethyl-3,5-dimethyladamantane as an intermediate in the reaction, which upon further isomerization will convert to 1,3,5,7-tetramethyladamantane. By stopping the reaction at the appropriate stage the 1-ethyl-3,5-dimethyl isomer can be obtained in good yield.

Typical conditions for effecting the above-discussed isomerization reactions include a weight ratio of the tricyclic naphthene to HF of 5–10 to 1, an HF:BF$_3$ weight ratio of 2–3 to 1 and a reaction temperature in the range of 60–100° C. As the reaction proceeds the concentration of the intermediate containing an ethyl group will build up in the reaction medium, pass through a maximum and thereafter continuously decrease as the ultimate polymethyladamantane product is formed. To obtain the best yield of the ethyl-containing intermediate, the reaction should be stopped when its maximum concentration is reached. The intermediate can be separated from the other isomers in the reaction mixture by distillation under superfractionating conditions. The purified intermediate can then be fluorinated by procedures as described above. On the other hand, when dimethyladamantane or trimethyladamantane is the desired product, the isomerization reaction is allowed to run its full course before the isomerization product is separated for fluorination.

The fluorinated products of the present invention have approximately the freezing and boiling characteristics shown in Table 1.

TABLE 1

| Parent hydrocarbon | Freezing point (° C.) | Boiling range (° C.) |
|---|---|---|
| 1-ethyladamantane | −55 | 178–205 |
| 1-ethyl-3-methyladamantane | <−80 | 180–207 |
| 1-ethyl-3,5-dimethyladamantane | <−80 | 185–210 |
| 1,3-dimethyladamantane | −30 | 173–201 |
| 1,3,5-trimethyladamantane | <−70 | 183–208 |

The boiling ranges shown are typical for products which are not completely fluorinated. The perfluorinated products of course are individual compounds and hence do not boil over a substantial range. From the data given it can be seen that the fluorinated products of the invention have an unusually large liquid range and hence can be used in applications where either very low or relatively high temperatures are encountered.

The following examples are illustrative of the invention:

EXAMPLE 1

Acenaphthene is dissolved in methylcyclohexane and then hydrogenated at 475° F. and under a hydrogen pressure of 500 p.s.i.g. using a 1% platinum-on-alumina catalyst to form perhydroacenaphthene ($C_{12}H_{20}$). After removal of most of the methylcyclohexane by distillation, the perhydroacenaphthene containing 3.3% of residual methylcyclohexane is charged in amount of 520 g. to an autoclave provided with means for effecting agitation. 70 g. of anhydrous HF are added, 30 g. of BF$_3$ are pressured into the autoclave and the mixture is heated to and maintained in the range of 60–100° C. and mainly in the neighborhood of 95° C. for 6.3 hours while being agitated. The reaction is then stopped, and the hydrocarbon layer is separated from the catalyst layer and washed to remove residual catalyst. Analysis of the hydrocarbon product by vapor phase chromatography gives the results shown in Table 2.

TABLE 2

| | Percent | |
|---|---|---|
| | Charge | Product |
| Methylcyclohexane | 3.3 | |
| Isodecalins | | 0.6 |
| 1,3-dimethyladamantane | | 20.1 |
| Non-bridgehead dimethyladamantanes | | 15.5 |
| 1-ethyladamantane | | 48.9 |
| Perhydroacenaphthene | 96.7 | |
| Perhydroacenaphthene and 2-ethyladamantane | | 14.9 |
| Total | 100.0 | 100.0 |

The data in Table 2 show that 1-ethyladamantane is the main product when the isomerization is carried out under the conditions described. The portion of effluent from the chromatograph containing the ethyladamantane is collected separately and 1-ethyladamantane of substantially 100% purity is obtained.

The 1-ethyladamantane is then fluorinated by vaporizing 15 ml. of it and passing the vapor along with a slow stream of nitrogen over a 700 g. bed of CoF$_3$ in a horizontal tubular reactor maintained at about 350° C. The reaction product is collected in a receiver cooled by Dry Ice. The collected material is then washed with water and dried. Elemental analysis of the product is as follows:

| | Percent |
|---|---|
| C | 27.5 |
| H | Trace |
| F | 72.5 |

These data show that the product is substantially completely fluorinated. In other words the product is essentially perfluoro-1-ethyladamantane. It has a freezing point of about −55° C. and a boiling point of about 205° C.

EXAMPLE 2

Perhydroanthracene is prepared by hydrogenating anthracene by the procedure used in the preceding example. A 617 g. mixture of 83.4% perhydroanthracene and 16.6% methylcyclohexane is isomerized using 85 g. of HF and 35 g. of BF$_3$ as catalyst. The reaction is carried out for 66 hours at about 90° C. The hydrocarbon product has the composition in Table 3 as determined by vapor phase chromatography.

TABLE 3

| | Percent | |
|---|---|---|
| | Charge | Product |
| C₄–C₇ | | 2.4 |
| Methylcyclohexane | 16.6 | 1.7 |
| Isodecalins | | 1.7 |
| 1,3,5,7-tetramethyladamantane | | 19.2 |
| 1-ethyl-3,5-dimethyladamantane | | 50.0 |
| Perhydroanthracenes | 83.4 | 25.0 |

The data in Table 3 show that 1-ethyl-3,5-dimethyladamantane is the major product. The effluent from the chromatograph that contained this compound is collected separately and substantially pure 1-ethyl-3,5-dimethyladamantane is thereby obtained. Disappearance of the methylcyclohexane in this run can be accounted for largely by cracking which forms light hydrocarbons that are lost through vaporization.

The 1-ethyl-3,5-dimethyladamantane is fluorinated by means of $CoF_3$ under conditions similar to those described in Example 1 except that the amount of $CoF_3$ is reduced to 200 g. Elemental analysis of the fluorinated product is as follows:

| | Percent |
|---|---|
| C | 29.4 |
| F | 69.7 |
| H | 0.5 |

These results correspond approximately to the empirical formula $C_{14}F_{21}H_3$, thus indicating that an average of about three hydrogen atoms per molecule remains in the product. Complete perfluorination can be achieved by subjecting the fluorinated material to further reaction in the presence of $CoF_3$.

The fluorinated product ($C_{14}F_{21}H_3$) is found to have the properties listed in Table 4.

TABLE 4

Properties of $C_{14}F_{21}H_3$

| | |
|---|---|
| Physical State at 25° C. | Colorless liquid. |
| Odor | None. |
| Boiling range | 185–210° C. |
| Freezing point | <−80° C. |
| Density at 20° C. | 1.8914. |
| Refractive index at 20° C. | 1.3100. |
| Dielectric constant | 3.21. |
| Power factor | 0.09. |

These data indicate that the product is particularly useful as a hydraulic fluid for either low temperature or relatively high temperature applications. The dielectric constant and power factor are generally higher than would be desired for electrical application. This is due to the presence of hydrogen atoms, and hence these values can be reduced by more complete fluorination of the product. The completely perfluorinated product has a boiling point in the neighborhood of 210° C.

EXAMPLE 3

Fluorene is hydrogenated under the conditions similar to those of Example 1. This produces perhydrofluorene ($C_{13}H_{22}$). Isomerization of the latter under conditions similar to those described in Example 2 results in a good yield of 1-ethyl-3-methyladamantane which is separately collected from the chromatograph effluent. Fluorination of this compound under conditions as in Example 1 except using 400 g. of $CoF_3$ yields a highly fluorinated product averaging 1–2 hydrogen atoms per molecule. This product is a colorless, odorless, liquid at room temperature. It has a freezing point of less than −80° C. and a boiling range of about 195–207° C. Elemental analysis shows that the product contains an average of 1–2 hydrogen atoms per molecule. The product can be further treated with $CoF_3$ to effect complete fluorination and yield perfluorinated product having a boiling point of about 207° C.

When the fluorination is done by electrolysis of the alkyladamantanes in HF, substantially the same results can be obtained.

We claim:

1. As a composition of matter, a mixture of highly fluorinated alkyladamantanes prepared by fluorinating an alkyladamantane selected from the group consisting of 1,3-dimethyladamantane, 1,3,5-trimethyladamantane, 1-ethyladamantane, 1-ethyl-3-methyl-adamantane and 1-ethyl-3,5-dimethyladamantane, and in which the degree of fluorination of said alkyladamantane is at least 75% of that corresponding to perfluorination.

2. Composition according to claim 1 in which the degree of fluorination is at least 90% of that corresponding to perfluorination.

3. As a composition of matter, highly fluorinated 1-ethyladamantane containing at least 15 fluorine atoms per molecule.

4. As a composition of matter, highly fluorinated 1,3-dimethyladamantane containing at least 15 fluorine atoms per molecule.

5. As a composition of matter, highly fluorinated 1-ethyl-3-methyladamantane containing at least 17 fluorine atoms per molecule.

6. As a composition of matter, highly fluorinated 1,3,5-trimethyladamantane containing at least 17 fluorine atoms per molecule.

7. As a composition of matter, highly fluorinated 1-ethyl-3,5-dimethyladamantane containing at least 18 fluorine atoms per molecule.

8. Perfluoro-1-ethyladamantane.
9. Perfluoro-1-ethyl-3-methyladamantane.
10. Perfluoro-1-ethyl-3,5-dimethyladamantane.
11. Perfluoro-1,3-dimethyladamantane.
12. Perfluoro-1,3,5-trimethyladamantane.

References Cited

UNITED STATES PATENTS

| 2,459,780 | 1/1949 | McBee et al. | 260—648 F |
| 2,928,865 | 3/1960 | Brasen et al. | 260—648 F |

DANIEL D. HOROWITZ, Primary Examiner

U.S. Cl. X.R.

252—66, 73